US010466934B2

(12) United States Patent
Dhingra et al.

(10) Patent No.: US 10,466,934 B2
(45) Date of Patent: Nov. 5, 2019

(54) METHODS AND SYSTEMS FOR TIME-BASED BINNING OF NETWORK TRAFFIC

(71) Applicants: Pragati Kumar Dhingra, New Delhi (IN); Priyanka Bhaskar, New Delhi (IN); Sucheta Dahiya, Faridabad (IN); Devang Sethi, Punjab (IN); Mohit Gupta, Ghaziabad (IN)

(72) Inventors: Pragati Kumar Dhingra, New Delhi (IN); Priyanka Bhaskar, New Delhi (IN); Sucheta Dahiya, Faridabad (IN); Devang Sethi, Punjab (IN); Mohit Gupta, Ghaziabad (IN)

(73) Assignee: GUAVUS, INC., San Mateo, CA (US)

( * ) Notice: Subject to any disclaimer, the term of this patent is extended or adjusted under 35 U.S.C. 154(b) by 251 days.

(21) Appl. No.: 15/593,768

(22) Filed: May 12, 2017

(65) Prior Publication Data

US 2018/0331922 A1 Nov. 15, 2018

(51) Int. Cl.
*G06F 3/06* (2006.01)
*H04L 12/835* (2013.01)
*H04L 12/26* (2006.01)

(52) U.S. Cl.
CPC ............ *G06F 3/067* (2013.01); *H04L 43/026* (2013.01); *H04L 43/062* (2013.01); *H04L 47/30* (2013.01)

(58) Field of Classification Search
None
See application file for complete search history.

(56) References Cited

U.S. PATENT DOCUMENTS

| | | | | |
|---|---|---|---|---|
| 6,958,998 B2 * | 10/2005 | Shorey | ................... | H04L 47/10 370/395.42 |
| 7,969,985 B1 * | 6/2011 | Cline | .................. | H04L 12/4035 370/394 |
| 2002/0143494 A1 * | 10/2002 | Conrad | ............... | H04L 41/5009 702/176 |
| 2003/0069952 A1 * | 4/2003 | Tams | ...................... | H04L 43/12 709/223 |
| 2007/0237079 A1 * | 10/2007 | Whitehead | .............. | H04L 43/00 370/235 |
| 2009/0046581 A1 * | 2/2009 | Eswaran | ............... | H04L 41/147 370/230 |
| 2014/0207775 A1 * | 7/2014 | Kittock | ................... | G06F 17/18 707/736 |
| 2015/0229555 A1 * | 8/2015 | Edsall | ..................... | H04L 47/30 370/235 |

* cited by examiner

*Primary Examiner* — Thomas J Dailey
(74) *Attorney, Agent, or Firm* — Morgan, Lewis & Bockius LLP (57) ABSTRACT

In various embodiments, network-traffic records overlapping multiple binning windows are prorated such that partial records are stored in each binning window of overlap. In addition, the full, non-prorated record is stored in at least one of the binning windows.

20 Claims, 4 Drawing Sheets

METHODS AND SYSTEMS FOR TIME-BASED BINNING OF NETWORK TRAFFIC

TECHNICAL FIELD

In various embodiments, the present invention relates to the analysis of network traffic, in particular for the analysis of network traffic via time-based binning approaches.

BACKGROUND

The widespread deployment of high-speed computer networks has revolutionized domains as commerce, entertainment, and data management. However, as more networks are deployed, and the sizes of such networks expand, monitoring traffic within the networks becomes increasingly more challenging. Network-traffic monitoring and analysis is important for many different purposes, including identification of network applications, enforcement of security protocols, accounting, network capacity planning, and compliance with data-retention regulations. One technique utilized to facilitate network-traffic monitoring is binning, i.e., the placement of network traffic into different groupings based on particular criteria. This facilitates analysis of temporal traffic patterns (e.g., which bins tend to fill up fastest) and detection of anomalies (e.g., consecutive empty bins indicating an unresponsive node), which, in turn, can trigger immediate troubleshooting and repair or, less urgently, re-allocation of resources to conform to changing usage profiles.

Many conventional binning approaches are inefficient, as they require that the traffic to be monitored be read twice—once to determine the bin size necessary to store all of the various records, and the second time to assign each record to the proper bin. Other conventional binning approaches, such as that described in U.S. Pat. No. 8,965,839, the entire disclosure of which is incorporated by reference herein, require the on-the-fly formation of new bins of various widths depending upon the record value.

In view of the foregoing, there is a need for systems and techniques for the improved binning of network traffic that efficiently store received network records as a function of time while enabling both bin-level analysis and analysis of the original records.

SUMMARY

Various embodiments of the present invention pertain to the binning of records (or "flows") of network traffic for annotation and/or analysis thereof. In accordance with embodiments of the invention, the records are binned into multiple binning windows (or, simply, "bins") each defined by a temporal interval, i.e., a start time and an end time; thus, the size of each bin corresponds to the time slice extending from the bin start time to the bin end time. The records to be binned are also defined, at least in part, by start and end times. Some records are easily and straightforwardly binned—such records have start and end times such that the entire record falls into a single bin. In such cases, the entire record is stored in that bin, and the record may be assigned a state value indicating that the binned record is an intact, undivided record. Various other records are too large to fit entirely within a single bin and/or, based on their start and end times, span or overlap multiple bins. In accordance with embodiments of the invention, such records are "prorated," i.e., divided into partial records that each fit within one of the bins that the records overlap. Such partial records may be assigned a different state value to indicate their prorated nature. In addition, the entire non-prorated (i.e., undivided) record may be stored in one or more of the bins so that any analysis utilizing intact records may be performed and/or so that the undivided record may be easily stored (e.g., persisted on a file system) and retrieved. The undivided record may be assigned a third state value to indicate that it is an intact record but that it has also been divided into partial records for binning purposes. In this manner, the state values assigned to each of the various types of records and partial records expedite analysis of the records.

In accordance with various embodiments of the invention, records and partial records may also be annotated before, after, or during binning. For example, records and/or partial records may be annotated with data (e.g., metadata) indicative of information such as user identification, network subscriber information, and/or cost per amount of information transmitted (e.g., cost per gigabyte of transmitted data).

In various embodiments, the binned records and partial records may be analyzed to detect or determine, for example, network traffic patterns, network anomalies, or profiles of usage of network resources. Utilizing such information, the network and/or one or more nodes thereof may be modified in a manner responsive to network traffic and/or usage. For example, one or more nodes may be modified, removed from, repositioned in, or added to the network, the network may be flow- or load-balanced, etc.

Embodiments of the invention may be utilized with many different types of network traffic. Thus, as utilized herein, the terms "record" and "flow" correspond to a collection of packets of network traffic observed and/or aggregated during a particular time interval and that may share one or more common properties, e.g., source, destination, protocol, packet header field(s), port number, packet contents, metadata, etc. (As used herein, the term "packet" can refer to an IP packet, a data frame, or any other data aggregation transmitted pursuant to a network protocol.) In an exemplary embodiment, records to be stored, prorated, and/or analyzed may include network traffic flows from network appliances such as routers, probes, and other devices that are used by mediation systems, accounting/billing systems, and network management systems. For example, records in embodiments of the invention may be flows generated and monitored in accordance with deep packet inspection (DPI), Internet Protocol Flow Information Export (IPFIX), and/or NetFlow protocols. Each of the bins may contain and store packets from many different records, and records may be prorated into partial records that are each stored in a different bin. Records may arise and be exported from various systems that are spread across large geographic distances, and the records may be collected by one or more network nodes at significant data rates. For example, in various embodiments, edge-collection nodes in various remote locations receive and bin records from portions of a network. The binned records may be preliminarily analyzed, and such analysis may be sent to other nodes in the network for further analysis and/or reporting.

Various steps of techniques detailed herein may be performed by computational devices (e.g., computers and/or network appliances) and/or computer-implemented modules or nodes that may include, consist essentially of, or consist of hardware and/or software. For example, packets may be aggregated into records by an exporter, which then routes the records to a collector for binning. The collector may also be utilized to annotate records and/or partial records, and further analysis of the records or partial records may be performed by the collector and/or a different computational node in the network.

In an aspect, embodiments of the invention feature a computer-implemented method of time-based collection of network traffic that includes, consists essentially of, or consists of a plurality of records received over time. Each record may include, consist essentially of, or consist of a plurality of data packets transmitted over a network (e.g., a data or telecommunications network). Each record may represent or indicate network traffic corresponding to and/or including, consisting essentially of, or consisting of a plurality of data packets. A plurality of binning windows for storage of records therein are defined as partitions in a computer memory. Each binning window has a bin start time, a bin end time, and a bin size extending from the bin start time to the bin end time. A record having a record start time, a record end time, and a record size extending from the record start time to the record end time is received via a network interface. The record overlaps a plurality of the binning windows extending from a first binning window to a final binning window. A partial record is stored in each of the memory partitions corresponding to the binning windows overlapped by the record. Each partial record contains the data packets of the record overlapping the binning window in which the partial record is stored. A first state value is assigned to each of the partial records by a processor. The record is stored in one of the plurality of memory partitions corresponding to the binning windows. A second state value is assigned to the record by the processor. The second state value may be different from the first state value.

Embodiments of the invention may include one or more of the following in any of a variety of combinations. The record may be stored in the memory partition corresponding to the final binning window. The record may be stored in the memory partition corresponding to the first binning window. The record may be stored in a memory partition corresponding to a window between the first binning window and the final binning window. The record may be stored in multiple different memory partitions corresponding to different binning windows. The record may be stored in a memory partition corresponding to a binning window not overlapped by the record. A second record having a record start time, a record end time, and a record size extending from the record start time to the record end time may be received via the network interface. The second record may overlap only one of the binning windows. The second record may be stored within the memory partition corresponding to the binning window the second record overlaps. A third state value may be assigned to the second record by the processor. The third state value may be different from the first state value, different from the second state value, or different from the first and second state values. The second record may be annotated (with e.g., data and/or metadata) by the processor. One or more of the partial records may be annotated (with e.g., data and/or metadata) by the processor. The bin size of at least two of the binning windows may be different. The bin size of all of the binning windows may be the same. The record size may be less than the size of at least one of the bins. The record size may be greater than the size of at least one of the bins. Prior to receiving the record, data packets may be computationally aggregated into the plurality of records. The bin size of one or more of the binning windows may be dynamically adjusted before and/or after storage of records or partial records.

In another aspect, embodiments of the invention feature a system for time-based collection of network traffic that includes, consists essentially of, or consists of a plurality of records received over time. Each record includes, consists essentially of, or consists of a plurality of data packets transmitted over a network (e.g., a data or telecommunications network). The system may include, consist essentially of, or consist of a computer memory and a processor-implemented collector. The system may include, consist essentially of, or consist of a computer processor, a computer memory, and a collector responsive to or implemented by the computer processor. The computer memory includes, consists essentially of, or consists of partitions defining a plurality of binning windows for storage of records therein. Each binning window has a bin start time, a bin end time, and a bin size extending from the bin start time to the bin end time. The collector electronically receives records, prorates records, stores records, and assigns state values. The collector is configured to receive a record having a record start time, a record end time, and a record size extending from the record start time to the record end time. The record overlaps a plurality of the binning windows extending from a first binning window to a final binning window. The collector is also configured to store a partial record in each of the memory partitions corresponding to the binning windows overlapped by the record. Each partial record contains the data packets of the record overlapping the binning window in which the partial record is stored. The collector is also configured to computationally assign a first state value to each of the partial records, store the record in a memory partition corresponding to one of the plurality of the binning windows, and computationally assign a second state value to the record. The second state value may be different from the first state value.

Embodiments of the invention may include one or more of the following in any of a variety of combinations. The collector may be configured to store the record in the memory partition corresponding to the final binning window. The collector may be configured to store the record in the memory partition corresponding to the first binning window. The collector may be configured to store the record in a memory partition corresponding to a binning window between the first binning window and the final binning window. The collector may be configured to store the record in memory partitions corresponding to multiple different binning windows. The collector may be configured to receive a second record having a record start time, a record end time, and a record size extending from the record start time to the record end time. The second record may overlap only one of the binning windows. The collector may be configured to store the second record within a memory partition corresponding to the binning window the second record overlaps. The collector may be configured to computationally assign a third state value to the second record. The third state value may be different from the first state value, different from the second state value, or different from the first and second state values. The system may include a processor-implemented annotation module configured to computationally annotate the second record (with e.g., data and/or metadata). The system may include an annotation module, responsive to or implemented by the computer processor (or a second computer processor different from the computer processor), configured to computationally annotate the second record (with e.g., data and/or metadata). The system may include a processor-implemented annotation module configured to computationally annotate the record and/or at least one of the partial records (with e.g., data and/or metadata). The system may include an annotation module, responsive to or implemented by the computer processor (or a second computer processor different from the computer processor), configured to computationally annotate the record and/or at least one of the partial records (with e.g., data and/or metadata). The bin size of at least two of the binning windows may be different. The bin size of all of the binning windows may be the same. The record size may be less than the size of at least one of the bins. The record size may be greater than the size of at least one of the bins. The system may include a processor-implemented exporter configured to (i) computationally assemble data packets into the plurality of records and (ii) export the records to the collector. The system may include an exporter, responsive to or implemented by the computer processor (or a second computer processor different from the computer processor), configured to (i) computationally assemble data packets into the plurality of records and (ii) export the records to the collector.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and may exist in various combinations and permutations. As used herein, the terms "approximately" and "substantially" mean±10%, and in some embodiments, ±5%. The term "consists essentially of" means excluding other materials that contribute to function, unless otherwise defined herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION

Embodiments of the present invention relate to the prorating and storage of network-traffic records that may be analyzed for the purpose of, for example, network monitoring, metering, and control. Various embodiments of the invention are implemented via a computer-based system that includes one or more computing devices (e.g., computers, servers, network appliances), each of which includes a processor and utilizes various program modules. Program modules may include, consist essentially of, or consist of computer-executable instructions that are executed by a conventional computer or processing unit. Generally, program modules include routines, programs, objects, components, data structures, etc. that perform particular tasks and/or implement particular abstract data types.

Those skilled in the art will appreciate that embodiments of the invention may be practiced with various computer system configurations, including multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote computer-storage media including memory storage devices.

Thus, systems in accordance with embodiments of the present invention may include, consist essentially of, or consist of one or more general-purpose computing devices each in the form of a computer or network appliance including a processing unit (or "processor" or "computer processor"), a system memory, and a system bus that couples various system components including the system memory to the processing unit. Computers typically include a variety of computer-readable media that can form part of the system memory and be read by the processing unit. By way of example, and not limitation, computer readable media may include computer storage media and/or communication media. The system memory may include computer storage media in the form of volatile and/or nonvolatile memory such as read only memory (ROM) and random access memory (RAM). The system memory may also include locally or remotely hosted databases and/or other storage devices, e.g., a storage area network (SAN). A basic input/output system (BIOS), containing the basic routines that help to transfer information between elements, such as during start-up, is typically stored in ROM. RAM typically contains data and/or program modules that are immediately accessible to and/or presently being operated on by processing unit. The data or program modules may include an operating system, application programs, other program modules, and program data. The operating system may be or include a variety of operating systems such as Microsoft WINDOWS operating system, the Unix operating system, the Linux operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MACINTOSH operating system, the APACHE operating system, an OPENSTEP operating system, or another operating system of platform.

Any suitable programming language may be used to implement without undue experimentation the functions described herein. Illustratively, the programming language used may include assembly language, Ada, APL, Basic, C, C++, C*, COBOL, dBase, Forth, FORTRAN, Java, Modula-2, Pascal, Prolog, Python, REXX, and/or JavaScript for example. Further, it is not necessary that a single type of instruction or programming language be utilized in conjunction with the operation of systems and techniques of the invention. Rather, any number of different programming languages may be utilized as is necessary or desirable.

The computing environment may also include other removable/nonremovable, volatile/nonvolatile computer storage media. For example, a hard disk drive may read or write to nonremovable, nonvolatile magnetic media. A magnetic disk drive may read from or writes to a removable, nonvolatile magnetic disk, and an optical disk drive may read from or write to a removable, nonvolatile optical disk such as a CD-ROM or other optical media. Other removable/nonremovable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

The processing unit that executes commands and instructions may be a general-purpose processor, but may utilize any of a wide variety of other technologies including special-purpose hardware, a microcomputer, mini-computer, mainframe computer, programmed micro-processor, micro-controller, peripheral integrated circuit element, a CSIC (customer-specific integrated circuit), ASIC (application-specific integrated circuit), a logic circuit, a digital signal processor, a programmable logic device such as an FPGA (field-programmable gate array), PLD (programmable logic device), PLA (programmable logic array), RFID processor, smart chip, or any other device or arrangement of devices that is capable of implementing the steps of the processes of embodiments of the invention.

Various components of systems in accordance with embodiments of the invention may be interconnected with each other and with other computers and/or network appliances (e.g., routers, switches, etc.) via a computer network. As used herein, a "computer network" or "network" is any wired and/or wireless configuration of intercommunicating computational nodes, including, without limitation, computers, switches, routers, firewalls, personal wireless devices, etc., and including local-area networks, wide-area networks, the Internet, cellular networks, satellite networks, and telecommunication and public telephone networks. Networks in accordance with embodiments of the present invention may be implemented using any known network protocol including various wired and/or wireless protocols such as, for example, Ethernet, universal serial bus (USB), global system for mobile communications (GSM), enhanced data GSM environment (EDGE), general packet radio service (GPRS), long term evolution (LTE), code division multiple access (CDMA), time division multiple access (TDMA), Bluetooth, Wi-Fi, voice over internet protocol (VOIP), Wi-MAX, etc.

Figure 1:
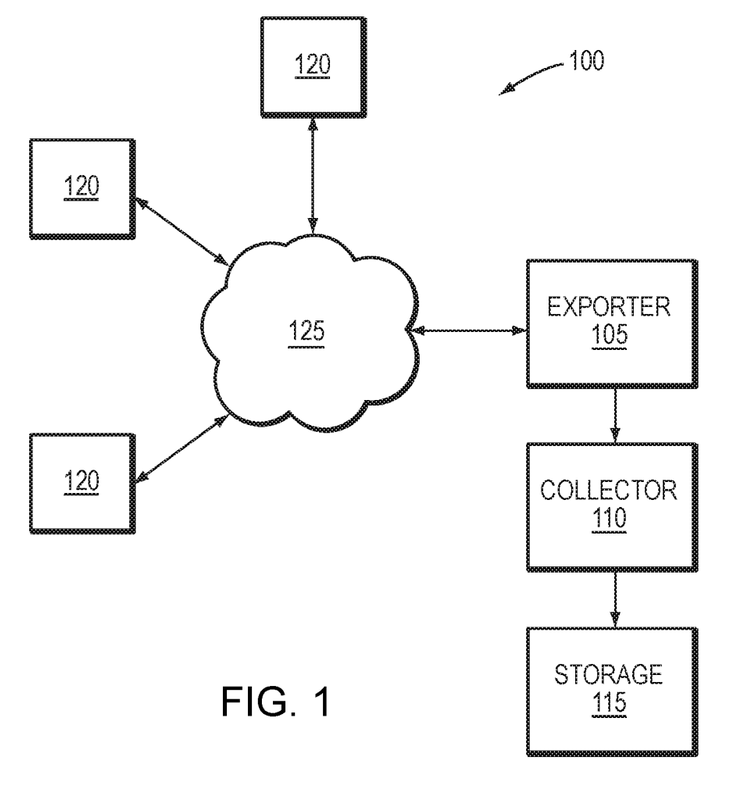
FIG. 1 is a block diagram of a system for network-traffic analysis in accordance with various embodiments of the present invention.

Thus, as depicted in FIG. 1, an exemplary network-traffic analysis system 100 in accordance with various embodiments of the invention features an exporter 105, a collector 110, and a storage (or "memory") 115 that are connected to one or more network nodes 120 via a computer network 125. Each of the nodes 120 may include, consist essentially of, or consist of any device deployed in computer network 125 that can control access to and use of the resources of the computer network 125. For example, a node 120 may include, consist essentially of, or consist of a network appliance such as a router, switch, hub, networking server, bridge, interface controller, wireless access point, or firewall, or a computing device such as a server, a workstation, a terminal, a desktop computer, a laptop computer, a cellular phone, or a tablet computer, or any other type of device with suitable ingress and egress ports. Each node 120 may even represent another network (e.g., a LAN or WAN) containing multiple network nodes. The exporter 105 and collector 110 may include, consist essentially of, or consist of a computing device, e.g., a server, which executes various program modules to perform methods in accordance with embodiments of the present invention. The memory 115 may include, consist essentially of, or consist of one or more volatile or non-volatile storage devices, e.g., random-access memory (RAM) devices such as DRAM, SRAM, etc., read-only memory (ROM) devices, magnetic disks, optical disks, flash memory devices, and/or other solid-state memory devices. All or a portion of the memory 115 may be located remotely from the collector 110 and/or the exporter 105, e.g., one or more storage devices connected to collector 110 via network 125 or another network. As utilized herein, the term "electronic storage" (or simply "storage") broadly connotes any form of digital storage, e.g., optical storage, magnetic storage, semiconductor storage, etc. Furthermore, a record or partial record may be "stored" via storage of the record or partial record itself, a copy of the record or partial record, a pointer to the record or partial record, or an identifier associated with the record or partial record, etc. In various embodiments, system 100 may include multiple exporters 105 and/or multiple collectors 110, and a single exporter 105 may export records to multiple collectors 110, and a single collector 110 may receive records from multiple exporters 105.

In accordance with embodiments of the invention, packets originating from one or more of the nodes 120 and/or being transmitted over network 125 are aggregated into records by the exporter 105. For example, the exporter 105 may be straightforwardly configured to monitor overall traffic from a network or subnetwork but ingest flows originating from a designated source, group of sources, subnetwork, or network. In various embodiments, the exporter 105 is a stand-alone device discrete from the collector 110, and in other embodiments the exporter 105 and the collector 110 represent different functionalities of a common computing device. The records from the exporter 105 are received by the collector 110 for storage, annotation, and/or analysis thereof. For example, the collector 110 may prorate records, store partial records, store full records, and annotate records and partial records as detailed further below. In various embodiments, the collector 110 defines multiple bins within the memory 115 for the storage of records and prorated records. For example, the bins may be logical memory partitions or, in some embodiments, may correspond to different banks of memory or different storage devices.

As embodiments of the invention involve the time-based collection and analysis of network traffic, in various embodiments, each of the defined bins has a start time and an end time; thus, the size of the bin is defined temporally to extend from the start time to the end time and represents the maximum size (i.e., time duration) of a record or partial record that may be stored within the bin. In various embodiments of the invention, each of the defined bins has the same bin size, but in other embodiments two or more of the bins have different sizes.

Each of the records received by the collector 110 via its network interface includes, consists essentially of, or consists of a collection of packets aggregated by the exporter 105 over a specific period of time. Thus, each record also has a start time and an end time, and hence the size of the record extends from the start time to the end time. As described in more detail below, each record received by the collector 110 may be stored within one or more of the bins, and records that overlap multiple bins may be prorated (i.e., divided) into partial records each overlapping with only one of the bins for storage therein. In addition, the collector 110 may assign a state value to records or partial records stored in the various bins. For example, different state values may be assigned to (1) prorated, partial records, (2) full records that required no prorating for storage, and (3) full records that also required prorating. In this manner, bin-wise analysis may be performed on stored records and partial records to identify when records were and were not prorated. Moreover, other annotations may be made to records and/or partial records by collector 110. For example, records and/or partial records may be annotated with data (e.g., metadata) indicative of information such as user identification, network subscriber information, and/or cost per amount of information transmitted (e.g., cost per gigabyte of transmitted data); such annotations may facilitate later analysis by collector 110 or another node connected to collector 110, storage 115, and/or network 125.

Figure 2:
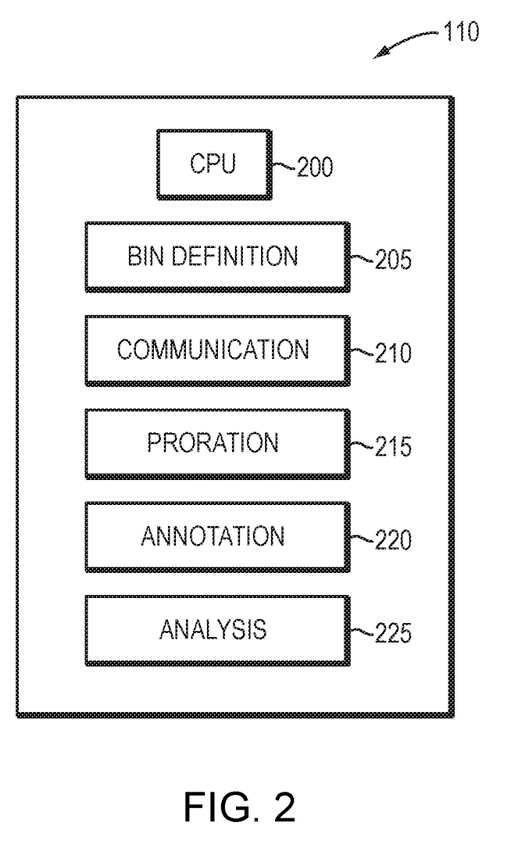
FIG. 2 is a block diagram of a collector for binning of network-traffic records in accordance with various embodiments of the present invention.

FIG. 2 is a schematic block diagram of a collector 110 in accordance with embodiments of the invention. As shown, the collector 110 may include a processor 200 that executes or controls various modules (e.g., program modules and/or hardware modules) that perform various aspects of embodiments of the invention. For example, the collector 110 may include a bin definition module 205 for the division of memory 115 (or a portion thereof) into multiple bins for storage of records and partial records. The division may be based on network traffic patterns affecting nodes from which records are received or on the nature and urgency of the analysis to be performed. If bins are found to fill too quickly or unevenly, the number of bins and their sizes may be adjusted dynamically.

The collector 110 may also include a communications module 210 for electronic communication with other nodes connected to network 125 (including the exporter 105). The communications module 210 may thus include one or more communications interfaces such as wired and/or wireless network interfaces. The communications module 210 may also facilitate interaction with one or more users of system 100 that are local to or remotely positioned from the collector 110. Thus, the communications module 210 may also include, e.g., one or more input devices such as a keyboard, mouse or other pointing device, or microphone (for spoken input) and/or one or more output devices such as a display, printer, speaker, etc.

In various embodiments of the invention, the collector 110 also includes a proration module 215 for the time-based division of records into prorated (i.e., partial) records, an annotation module 220 for annotation of records and partial records, and an analysis module 225 for analysis of binned records, binned partial records. In various embodiments, the analysis module 225 is not a part of collector 110 and is instead performed by a dedicated device (e.g., a server or other computing device) interconnected to collector 110 and/or memory 115 (e.g., via network 125). Operation of the annotation module 220 may be facilitated by a database storing records (or pointers thereto) and associated annotations as attributes of the records. The database may be local and established within the memory of the collector 110 or may be remote.

Once received by the collector 110, the records from the exporter 105 are stored in bins and prorated for storage into multiple bins if necessary. As noted above, the term "store in" does not necessarily require physical storage of an entire record within a memory partition corresponding to a bin. Rather, the records may be stored in a conventional buffer arrangement and the bins may be database entries populated by pointers to the records or their constituent data packets that have been assigned to the bins.

Figure 3:
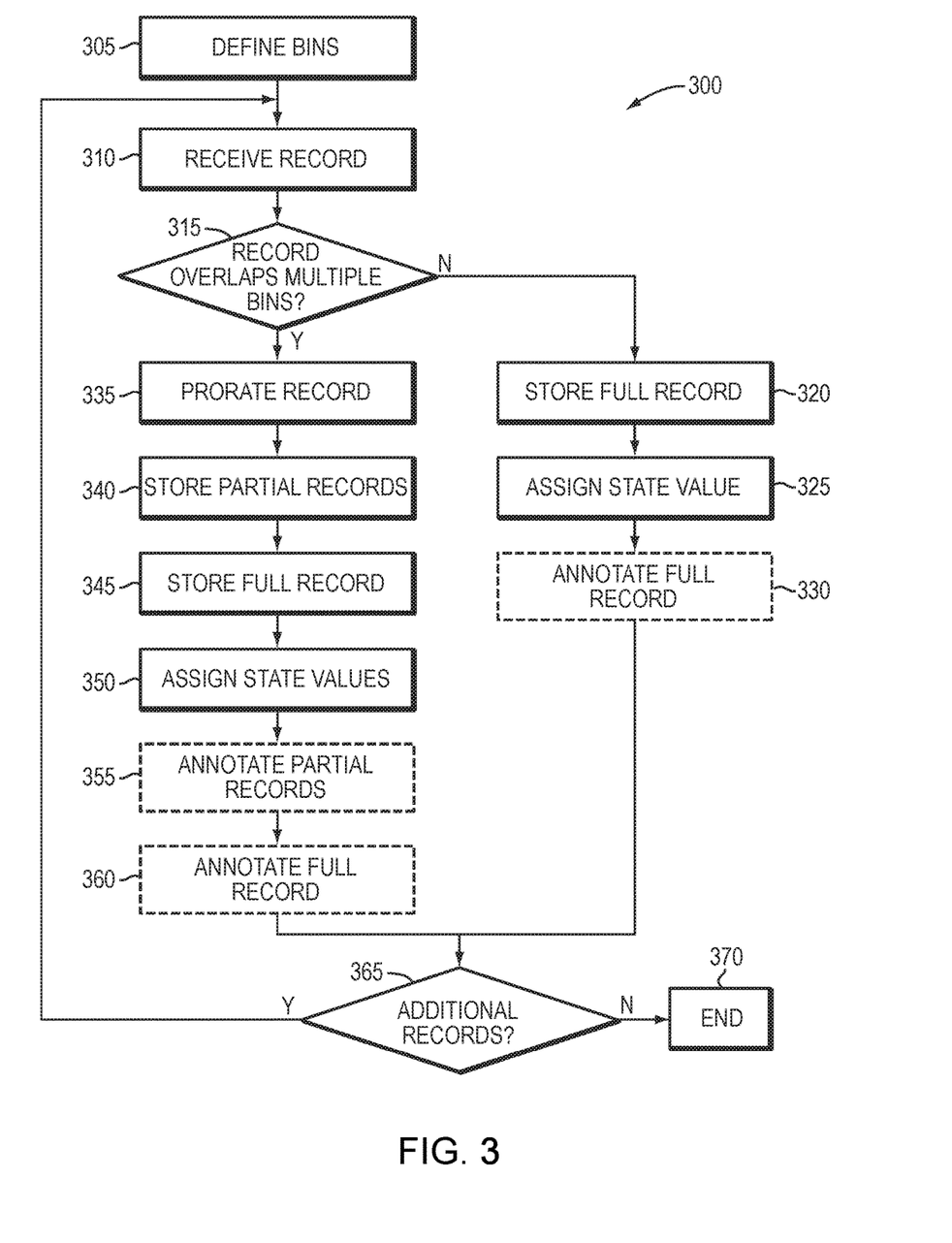
FIG. 3 is a flowchart of a method for network record storage and annotation in accordance with various embodiments of the present invention.

FIG. 3 depicts an illustrative method 300 for record proration and storage in accordance with embodiments of the present invention. While the various steps of method 300 are depicted as occurring in a particular order, the depicted order and the number and definition of the steps are not limiting. Other embodiments of the invention feature more or fewer steps and/or steps performed in different orders. As shown, in step 305, the collector 110, via bin definition module 205, defines multiple bins for the time-based storage of records from the exporter 105. In typical embodiments, the bins do not overlap each other in time; thus, in such embodiments each bin has a unique start time and end time that collectively define the bin size as a temporal interval. In various embodiments, there are no gaps in time between the end time of one bin and the start time of the next bin. In addition, in various embodiments the bins defined in step 305 have substantially the same bin size; in other embodiments, the sizes of two or more of the bins are different. After bin definition, in step 310 a record is received by the collector 110 from the exporter 105. The record corresponds to a number of packets, and the size of the record (i.e., the temporal extent of the record from its start time to end time) is analyzed by the collector 110 to determine whether the record falls within a single bin or overlaps multiple bins in step 315. If the record falls within a single bin, i.e., if the record start time is equal to or later than a bin's start time and the record end time is equal to or earlier than the end time of the same bin, then the record needs no proration. Thus, in step 320, the full, undivided record is stored in the bin with which it overlaps. In step 325, a state value representative of the record not being prorated may be assigned to the record before, after, or during storage of the record. In an optional step 330, the record may be annotated with one or more other pieces of data and/or metadata before, after, or during storage of the record. While in some embodiments this involves alteration to the record itself, more typically annotation refers to adding information to a database entry corresponding to the record.

Various records received by the collector 110 will have sizes exceeding that of one or more of the bins, and will therefore overlap or span multiple bins. In addition, even records having sizes less than or equal to the size of one or more bins may overlap multiple bins, depending on the relationship between the record start and end times and the bin start and end times. For example, a record may have a start time that falls within one bin and an end time that falls within the subsequent bin. As shown in FIG. 3, in cases in which a received record overlaps multiple bins, the record may be prorated in step 335. In various embodiments, the record is prorated by dividing the record into two or more partial records that each overlaps with only one bin. For example, a full record that starts within a first bin and ends within a second bin may be divided into (1) a first partial record that starts at the record start time and ends at the end time of the first bin, and (2) a second partial record that starts at the start time of the second bin and ends at the record end time. Likewise, records overlapping three or more bins may be prorated into three or more partial records. In step 340, each of the partial records is stored in the bin with which it overlaps (again, the term "stored in" extends to assigning identifiers of the partial records to database entries corresponding to the bins). In accordance with embodiments of the invention, full records that overlap with multiple bins are also stored in intact form to facilitate subsequent analysis that may be more difficult or time-consuming when performed on partial, prorated records. Thus, in step 345, the full, non-prorated record is also stored in at least one of the bins in which the prorated records are stored. For example, in various embodiments of the invention, the last bin (e.g., by bin end time) utilized to store one of the prorated records is also utilized to store the full record. In other embodiments, the full record is stored in one of the other bins utilized to store one of the prorated records (e.g., the first bin by bin end time). In various embodiments, copies of the full record are stored in two or more (or even all) of the bins. Before, during, or after storage of the prorated records and the full record, state values are assigned to the partial records and the full record in step 350. In various embodiments, the state values assigned in step 350 are different from the state value assigned to full records that required no proration in step 325. In addition, the state values assigned to partial records and to full records in step 350 may be different from each other. In this manner, full records that were not prorated, full records that were prorated, and prorated partial records may all be distinguished on the basis of assigned state values. As detailed above for step 330, in optional steps 355 and 360, partial records and the full records stored in steps 340, 345 may be annotated with one or more other pieces of data and/or metadata before, after, or during storage of the record or partial record. Finally, the collector 110 determines if additional records are being communicated by the exporter 105 in step 365, and if so, the method repeats starting at step 310. If no additional records are to be received, the method 300 ends at step 370.

Figure 4:
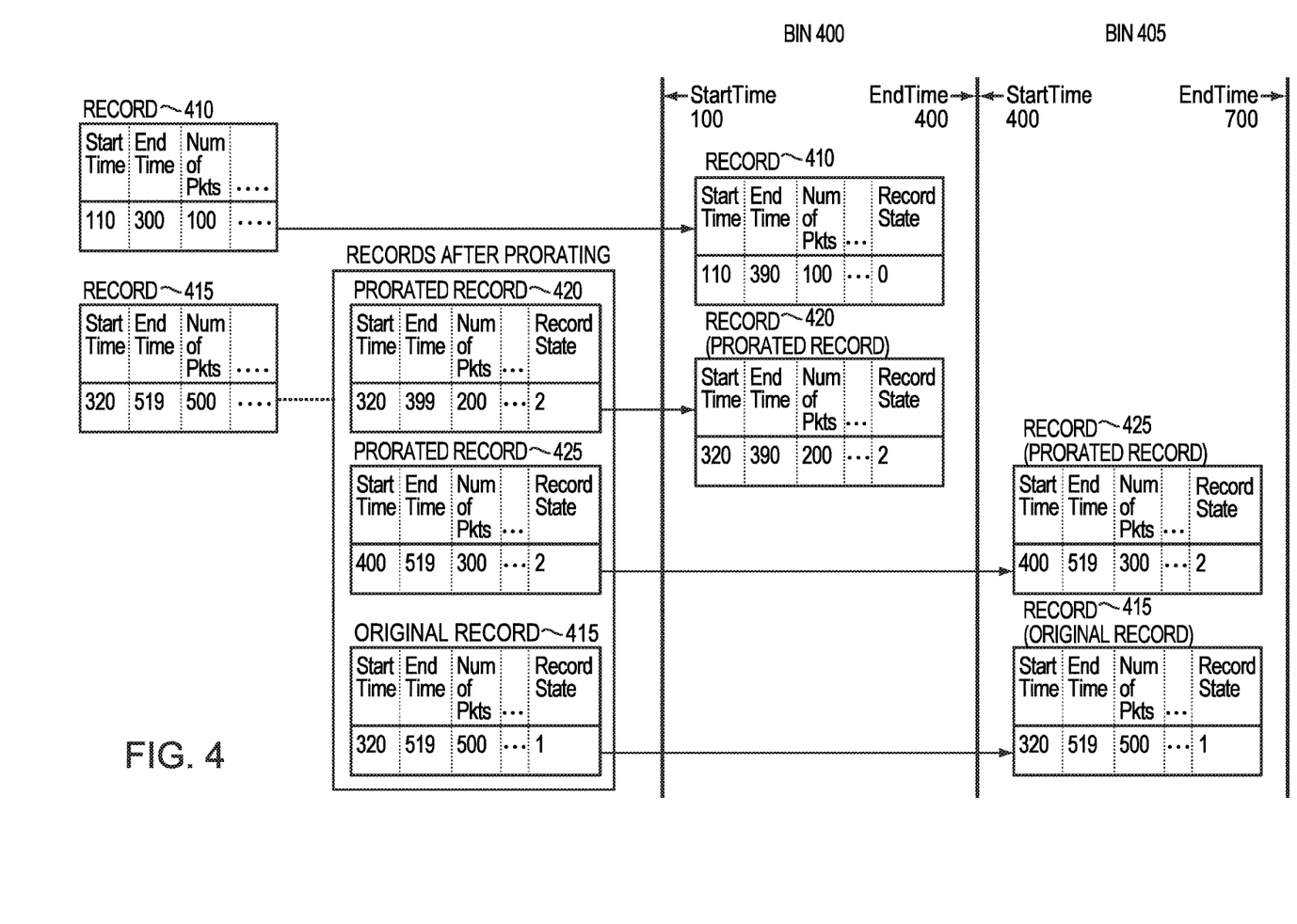
FIG. 4 is a schematic diagram of the proration and storage of exemplary received network records in accordance with various embodiments of the present invention.

FIG. 4 depicts an illustrative application of record proration and storage in accordance with embodiments of the present invention. In the example shown in FIG. 4, a bin 400 is defined as having a bin start time of 100 seconds and a bin end time of 400 seconds, and a bin 405 is defined as having a bin start time of 400 seconds and a bin end time of 700 seconds. A record 410 having a record start time of 110 seconds and a record end time of 300 seconds and containing 100 packets is received. As shown, since the record 410 overlaps only bin 400 (i.e., its record start and end times fit within the bin start and end times of bin 400), record 410 is simply stored in bin 400. The record 410 is also assigned a state value of 0, representing a full record that has not been prorated.

A record 415 is also received; as shown in FIG. 4, record 415 has a record start time of 320 seconds and a record end time of 519 seconds and contains 500 packets. Since record 415 overlaps both bin 400 and bin 405, record 415 is prorated in accordance with embodiments of the invention. As shown, record 415 is prorated into (1) a partial or prorated record 420 having a record start time of 320 seconds and a record end time of 399 seconds, such that prorated record 420 fits within bin 400, and (2) a prorated record 425 having a record start time of 400 seconds and a record end time of 519 seconds, such that prorated record 425 fits within bin 405. Prorated record 420 represents approximately 40% of the full record 415, and thus prorated record 420 contains 200 packets of record 415. Likewise, prorated record contains the remaining 300 packets. As shown in FIG. 4, prorated record 420 is stored in bin 400 and prorated record 425 is stored in bin 405. In addition, in order to preserve the full record 415, the full record 415 (or a copy thereof or pointer thereto) is also stored in bin 405. This stored record 415 is assigned a state value of 1 (representing a full record that has also been prorated), and the prorated records 420, 425 are assigned state values of 2 (representing prorated partial records).

The assigned state values depicted in FIG. 4 are arbitrary and are not limitations of the present invention; any different and distinguishable state values, alphanumeric or otherwise, may be assigned and/or annotated to partial prorated records, full records that have been prorated, and full records that have not been prorated in accordance with embodiments of the invention. While the bins 400, 405 are defined as time periods expressed in seconds and have the same size, these are also not limitations of the present invention; bins in accordance with embodiments of the invention may have sizes that are the same or different from each other and may be defined utilizing any unit of time.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A computer-implemented method of time-based collection of network traffic that comprises a plurality of records received over time, wherein each record comprises a plurality of data packets transmitted over a network, the method comprising:
    defining, as partitions in a computer memory, a plurality of binning windows for storage of records therein, each binning window having a bin start time, a bin end time, and a bin size extending from the bin start time to the bin end time;
    receiving, via a network interface, a record having a record start time, a record end time, and a record size extending from the record start time to the record end time, wherein the record overlaps a plurality of the binning windows extending from a first binning window to a final binning window;
    storing a partial record in each of the memory partitions corresponding to the binning windows overlapped by the record, each partial record containing the data packets of the record overlapping the binning window in which the partial record is stored;
    assigning, by a processor, a first state value to each of the partial records;
    storing the record in one of the plurality of memory partitions corresponding to the binning windows; and
    assigning, by the processor, a second state value different from the first state value to the record.

2. The method of claim 1, wherein the record is stored in the memory partition corresponding to the final binning window.

3. The method of claim 1, further comprising:
    receiving a second record having a record start time, a record end time, and a record size extending from the record start time to the record end time, wherein the second record overlaps only one of the binning windows;
    storing the second record within the memory partition corresponding to the binning window it overlaps; and
    assigning, by the processor, a third state value different from the first and second state values to the second record.

4. The method of claim 3, further comprising annotating, by the processor, the second record.

5. The method of claim 1, further comprising annotating, by the processor, at least one of the partial records.

6. The method of claim 1, wherein the bin size of all of the binning windows is the same.

7. The method of claim 6, wherein the record size is less than the bin size.

8. The method of claim 6, wherein the record size is greater than the bin size.

9. The method of claim 1, further comprising, prior to receiving the record, computationally aggregating data packets into the plurality of records.

10. The method of claim 1, wherein bin sizes of at least two of the binning windows are different from each other.

11. The method of claim 1, further comprising adjusting the bin size of at least one of the binning windows.

12. A system for time-based collection of network traffic that comprises a plurality of records received over time, wherein each record comprises a plurality of data packets transmitted over a network, the system comprising:
   a computer memory comprising one or more volatile or non-volatile storage devices and partitions defining a plurality of binning windows for storage of records therein, each binning window having a bin start time, a bin end time, and a bin size extending from the bin start time to the bin end time;
   a processor; and
   a collector, responsive to or implemented by the processor, for electronically receiving records, prorating records, storing records, and assigning state values, the collector being configured to:
      receive a record having a record start time, a record end time, and a record size extending from the record start time to the record end time, wherein the record overlaps a plurality of the binning windows extending from a first binning window to a final binning window,
      store a partial record in each of the memory partitions corresponding to the binning windows overlapped by the record, each partial record containing the data packets of the record overlapping the binning window in which the partial record is stored,
      computationally assign a first state value to each of the partial records,
      store the record in a memory partition corresponding to one of the plurality of the binning windows, and
      computationally assign a second state value different from the first state value to the record.

13. The system of claim 12, wherein the collector is configured to store the record in the memory partition corresponding to the final binning window.

14. The system of claim 12, wherein the collector is configured to:
   receive a second record having a record start time, a record end time, and a record size extending from the record start time to the record end time, wherein the second record overlaps only one of the binning windows;
   store the second record within a memory partition corresponding to the binning window it overlaps; and
   computationally assign a third state value different from the first and second state values to the second record.

15. The system of claim 14, further comprising a processor-implemented annotation module configured to computationally annotate the second record.

16. The system of claim 12, further comprising a processor-implemented annotation module configured to computationally annotate (i) the record and/or (ii) at least one of the partial records.

17. The system of claim 12, wherein the bin size of all of the binning windows is the same.

18. The system of claim 17, wherein the record size is less than the bin size.

19. The system of claim 17, wherein the record size is greater than the bin size.

20. The system of claim 12, further comprising a processor-implemented exporter configured to (i) computationally assemble data packets into the plurality of records and (ii) export the records to the collector.

\* \* \* \* \*